W. BURNS.
VEHICLE FENDER.
APPLICATION FILED JUNE 14, 1915.

1,184,670.

Patented May 23, 1916.
2 SHEETS—SHEET 1.

WITNESSES
A. W. Walstrom
O. E. Sorensen

INVENTOR
WILLIAM BURNS
BY Paul & Paul
ATTORNEYS

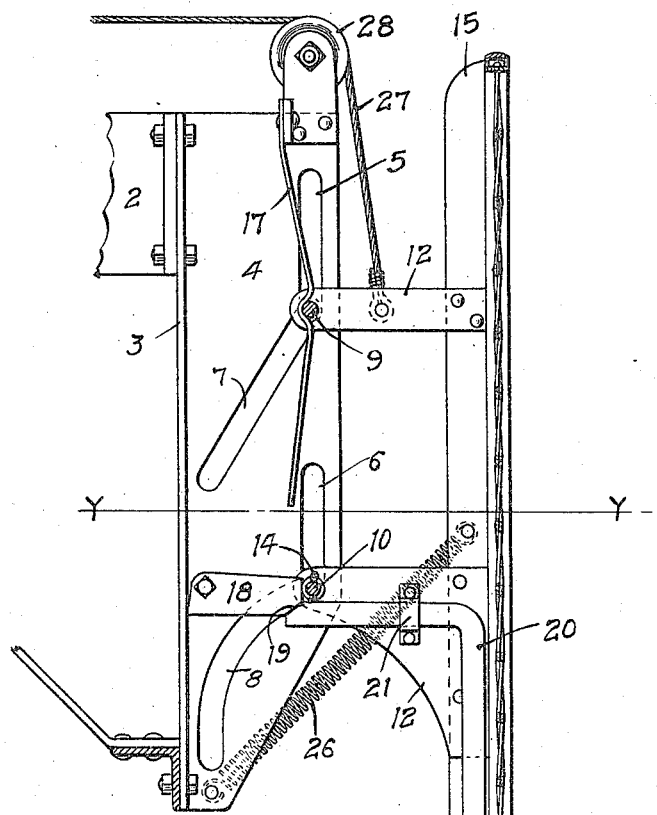
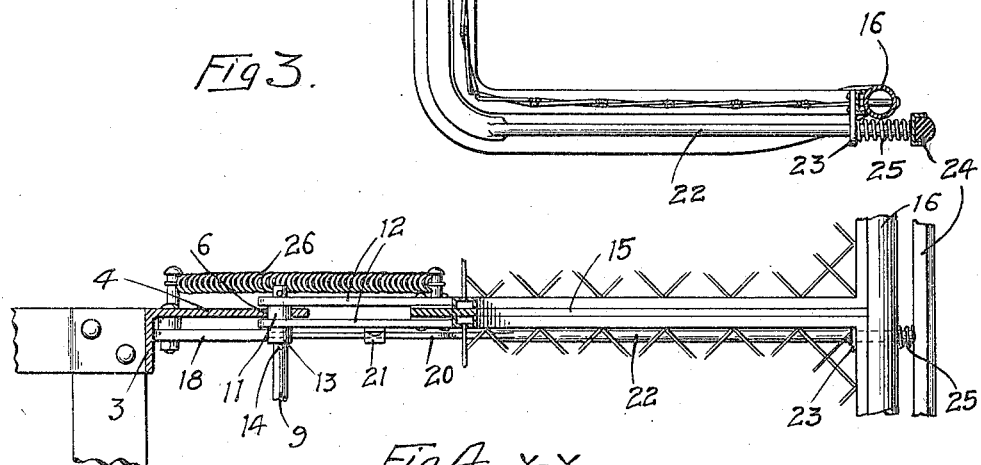

UNITED STATES PATENT OFFICE.

WILLIAM BURNS, OF MINNEAPOLIS, MINNESOTA.

VEHICLE-FENDER.

1,184,670. Specification of Letters Patent. Patented May 23, 1916.

Application filed June 14, 1915. Serial No. 34,009.

*To all whom it may concern:*

Be it known that I, WILLIAM BURNS, citizen of the United States, resident of Minneapolis, county of Hennepin, State of Minnesota, have invented certain new and useful Improvements in Vehicle-Fenders, of which the following is a specification.

My invention relates to power propelled vehicles and while applicable to automobiles generally, is designed particularly for trucks which are usually heavily loaded while running through the streets and have sufficient momentum to make it difficult, if not impossible, to stop them quickly.

The object of my invention is to provide a device which, while normally supported in a raised position, will automatically assume a depressed or pick-up position when it contacts with any object in the street.

A further object is to provide a fender of extremely simple construction and one which can be easily applied to a truck or car at comparatively little expense.

The invention consists generally in various constructions and combinations, all as hereinafter described and particularly pointed out in the claims.

Figure 1:
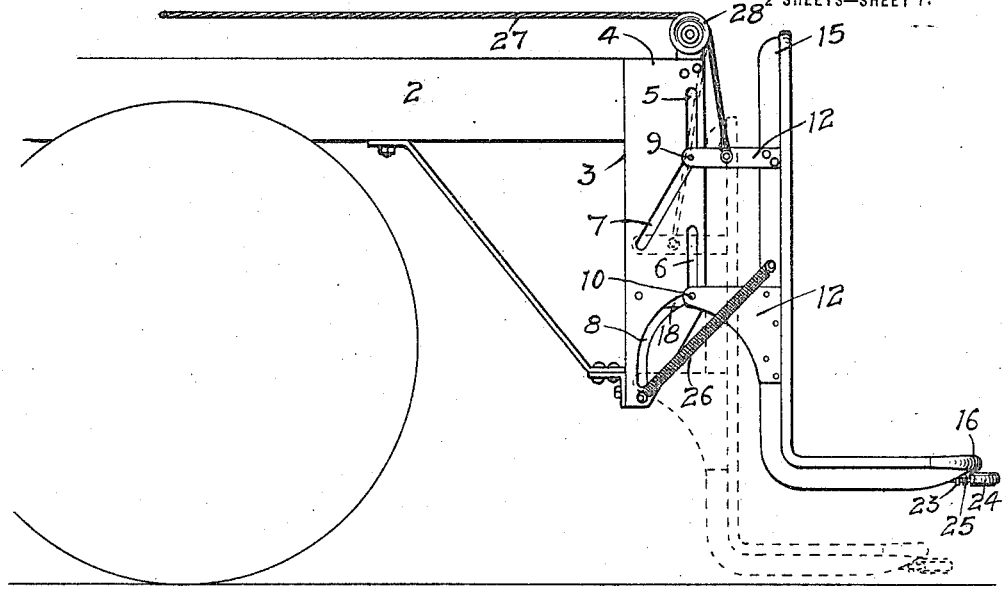
Figure 2:
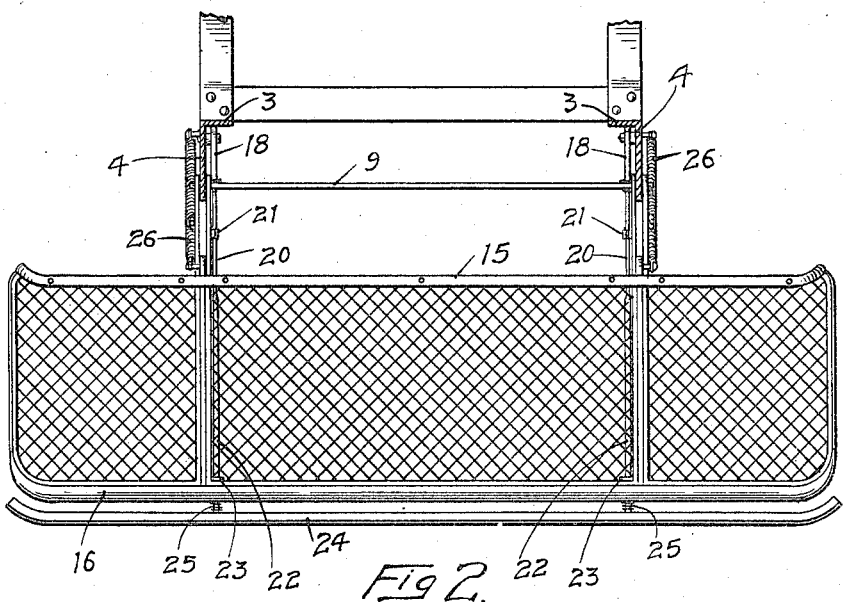

In the accompanying drawings forming part of this specification, Figure 1 is a side elevation of the forward portion of a truck with my invention applied thereto, Fig. 2 is a plan view of the same, Fig. 3 is an enlarged detail view, illustrating the normal position of the fender and the releasing mechanism therefor, Fig. 4 is a sectional view on the line y—y of Fig. 3.

In the drawing, 2 represents the forward portion of a truck and 3 angle bar brackets vertically mounted thereon. There are preferably a pair of these brackets, one on each side of the machine. The forwardly projecting flange 4 of each bracket is provided with vertical slots 5 and 6, one near the top and one near the bottom of the flange and in substantial alinement with one another. The upper slots have downwardly and rearwardly projecting extensions 7 and the lower slots have similar extensions 8, except that they are preferably curved or bowed rearwardly and downwardly from the lower ends of the lower vertical slots. In these slots 5 and 6 I arrange rods 9 and 10 having anti-friction rollers 11 thereon to bear on the walls of the slots. Bars 12 straddle the flanges 4 and are mounted on the rods 9 and 10 and held in place thereon by collars 13 and cotter pins 14. These bars 12 I arrange in pairs, two at the top and two at the bottom on each side of the fender and at their forward ends are secured to the fender frame 15, which may be of any suitable construction, comprising an upright portion and a horizontal lower portion, so that the frame in cross section is comparatively L-shaped. Usually this frame is made of channel bar and in front of the horizontal section I may prefer to provide a tubular member 16 that is bolted or riveted to the channel bar frame. Springs 17 are mounted on the upper portion of the brackets 4 and have depending portions which bear on the upper rod 9 and normally hold this rod at the intersection of the slots 5 and 7. The rod 10 is normally held on seats provided at the intersection of the slots 6 and 8 by means of dogs 18 pivoted on the flanges 4 and having forward ends to bear on the collars 13, which may form anti-friction rollers therefor. These dogs have beveled forward ends 19, as indicated in Fig. 3. When these dogs are in the position shown in Fig. 3, the rod 10 will be locked and the fender will be positively held in its raised position. To trip the dogs, I provide L-shaped bars 20 movable in guides 21 and having rear ends to contact with the beveled faces 19 and trip the dogs when the fender strikes an obstruction.

Rods 22 are movable in guides 23 on the forward portion of the fender and support a contact bar 24 at their forward ends. Springs 25 are provided between the contact bar 24 and said guides for normally resisting backward movement of the bar. The rear ends of the rods are connected to the bars 20 and when an object is struck on the track, street, or roadway, the dogs 18 will be dropped and the fender, aided by the springs 26, will be drawn downwardly and backwardly to a point near the ground line where it will pick up the person or object in the path of the truck and prevent injury by the wheels.

It will be noted from the foregoing description that the fender, when released, drops downward and backward and consequently, when the contact bar touches a person, the backward jump of the fender while assuming its depressed position, will insure the depression of its forward end sufficiently to clear the person and pick up the body on the horizontal portion of the fender. In drop fenders as generally constructed, only a vertical movement is provided and in that case the fender may drop down upon the person that is struck and pass over the body, instead of picking it up. Even if the machine is running rapidly, the downward and backward movement of the fender will be accomplished in sufficient time to insure the successful pick-up of the person or object in the track of the truck.

For raising the fender to the upper portion of the slots 5 and 6 I provide a cable 27 passing over suitable sheaves 28 and attached to the fender and extending to a suitable operating lever on the truck, not shown.

I claim as my invention:

1. The combination, with a vehicle, of a fender support secured thereto and provided with slots arranged in pairs, rods fitting within said slots, a fender mounted on said rods to move vertically therewith, the lower portions of said slots being inclined backwardly for depressing the forward portion of said fender, and means normally holding said rods and fender against premature downward movement.

2. The combination, with a vehicle and a fender support thereon provided with downwardly and backwardly inclined guides, of a fender mounted to slide in said guides, a locking means for said fender, and means actuated by contact with an obstacle in front of the fender for tripping said locking means.

3. The combination, with a vehicle, of a fender having a downward and backward movement thereon, a latch for locking said fender in its normal raised position, and means actuated by contact with an object in the path of the fender for tripping said latch, said fender, when released, receding from said obstacle.

4. The combination, with a vehicle, of a fender comprising an upright and a horizontal portion, a support mounted on said vehicle and having guides wherein the upright portion of said fender is supported and directed downwardly and backwardly when released, means for normally locking said fender in its raised position, said horizontal portion being normally near the ground line and having means in position to be struck by an obstacle for tripping said locking means.

5. The combination, with a vehicle having a fender support and guides therein provided with downwardly and rearwardly inclined portions, rods slidable in said guides, a fender mounted on said rods and movable therewith, latches engaging a rod for locking said fender in its raised normal position, and means for tripping said latches to release said fender.

6. The combination, with a vehicle having a fender support provided with guide slots having downwardly and rearwardly inclined lower portions, rods fitting within said slots and normally seated therein at the upper ends of said downwardly and rearwardly inclined portions, a fender mounted on said rods, means for normally locking said rods, means for tripping said locking means and means for raising said fender and rods to the upper portions of said guide slots, for the purpose specified.

7. The combination, with a vehicle having a fender support provided with a substantially vertical guide having a downwardly and backwardly projecting extension, a fender mounted to move up and down in the vertical portion of said guide and having means for locking it therein, and a device for tripping said locking means to allow said fender to drop downwardly and backwardly into the lower portion of said guide.

8. A vehicle having a fender support provided with guides having upright upper portions and downwardly and backwardly inclined lower portions, a fender mounted to move in said guides, means for locking it in the upper portions thereof, and means for tripping said locking means to allow said fender to drop downwardly and backwardly into the lower portions of said guides.

In witness whereof, I have hereunto set my hand this 8" day of June, 1915.

WILLIAM BURNS.

Witnesses:
GENEVIEVE E. SORENSEN,
EDWARD A. PAUL.

Copies of this patent may be obtained for five cents each, by addressing the "Commissioner of Patents, Washington, D. C."